(12) United States Patent
Tanaka et al.

(10) Patent No.: US 7,880,735 B2
(45) Date of Patent: Feb. 1, 2011

(54) DISPLAY DEVICE AND ELECTRICAL APPARATUS USING THE SAME

(75) Inventors: Junichi Tanaka, Nara (JP); Syuichi Kouzaki, Nara (JP); Masaya Hijikigawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 890 days.

(21) Appl. No.: 11/542,238

(22) Filed: Oct. 4, 2006

(65) Prior Publication Data

US 2008/0084516 A1 Apr. 10, 2008

(51) Int. Cl.
*G09G 5/00* (2006.01)
(52) U.S. Cl. .................................. 345/204; 359/267
(58) Field of Classification Search ................ 345/108, 345/204; 349/56; 359/267
See application file for complete search history.

(56) References Cited

U.S. PATENT DOCUMENTS

| | | | |
|---|---|---|---|
| 4,214,820 A * | 7/1980 | Leibowitz et al. ........... | 359/275 |
| 4,299,880 A | 11/1981 | Arens | |
| 4,583,824 A * | 4/1986 | Lea ........................... | 359/223.1 |
| 5,731,792 A | 3/1998 | Sheridon | |
| 6,741,386 B2 * | 5/2004 | Minami ...................... | 359/296 |
| 7,167,156 B1 * | 1/2007 | Glass ......................... | 345/107 |
| 2006/0220988 A1 * | 10/2006 | Hillis et al. .................. | 345/30 |

FOREIGN PATENT DOCUMENTS

| | | |
|---|---|---|
| JP | 55-69126 A | 5/1980 |
| JP | 61-59491 | 12/1986 |
| JP | 63-36512 B2 | 7/1988 |
| JP | 4-48349 | 8/1992 |
| JP | 4-268539 A | 9/1992 |
| JP | 10-39799 A | 2/1998 |

* cited by examiner

*Primary Examiner*—Stephen G Sherman
(74) *Attorney, Agent, or Firm*—Nixon & Vanderhye P.C.

(57) ABSTRACT

In a display device that displays by allowing external light to be incident from outside, and reflecting the incident external light so as to output the incident external light from a display surface, a porous body having a front face that is provided on the display surface side is used. Moreover, a colorless and transparent material is used for this porous body, an one-end opening is formed on the front face side in the porous body, and plural small pores that are independent of one another are provided inside the porous body.

15 Claims, 10 Drawing Sheets

DISPLAY DEVICE AND ELECTRICAL APPARATUS USING THE SAME

BACKGROUND OF THE INVENTION

1. Field of the Invention

The present invention relates to a display device, in particular, a display device whose display color on a display surface side can be changed by allowing a liquid to inflow into or outflow from an inside of a small pore of a porous body, and relates to an electrical apparatus using the display device.

2. Description of Related Art

Conventionally, as image displays using display devices that display information such as letters and images, image displays of non-light-emission types that utilize external light such as light from illumination devices and sunlight, and image displays of light-emission types that do not utilize external light or the like have been provided. The above-described image displays of non-light-emission types include liquid crystal displays of transmission types, reflection types and the like. Whereas, the image displays of light-emission types include plasma display panels, electro luminescence panels and field emission displays.

However, the above-described image displays of either light-emission types or non-light-emission types using the conventional display devices cannot allow users to recognize textures like white papers. That is, the conventional display devices cannot achieve white display with sufficient display quality, and it is afraid that high-definition display cannot be achieved.

For example, JP 4(1992)-48349 B suggests the use of an opaque porous body that is colored in white or a pastel color, as a sheet material composing a display surface, in a display device of a first conventional example. Moreover, in this display device of the first conventional example, a liquid for display having a refractive index that is close to a refractive index of the porous body is prepared, and is applied on a surface of the porous body according to the information to be displayed. Furthermore, in the display device of the first conventional example, the liquid penetrates small pores of the porous body, so as to decrease a light reflectance of the display surface with respect to external light and make the display surface to be partly transparent, so that the information can be displayed by a base that is provided beneath the porous body.

In addition, display devices of second and third conventional examples include a display device of an electroosmosis system, which moves a liquid by applying an electric field to a porous body, as respectively described in JP 61(1986)-59491 B and JP 63(1988)-36512 B, for example.

More specifically, in the display devices of the second and third conventional examples, a liquid impregnation rate of the surface of the opaque or colored porous body is controlled so as to scatter external light, whereby a light reflectance and a light transmittance thereof with respect to external light can be controlled. Moreover, in these display devices of the second and third conventional examples, the refractive index of the porous body is made to be equal to the refractive index of the transparent liquid in advance, so that the porous body can be transparent by filling insides of through holes (small pores) of the porous body with the liquid, and can reflect the external light by allowing the liquid to outflow from the through holes.

However, in the above-described display devices of the first to third examples, the opaque or colored porous body is used, and thus it is sometimes difficult for the display devices to improve the display quality of the white display and to achieve the high-definition display. That is, in these display devices of the conventional examples, external light is reflected by an interface between an inner wall surface of the porous body surrounding the small pore and air in the small pore, whereby the white display is achieved. However, in the case where the porous body is opaque, the external light that transmits the inside of the porous body from the inner wall surface is absorbed by the porous body, so that an efficiency to utilize the external light is decreased. Thus, in the case of using the opaque porous body, loss of light is likely to occur on the display surface, and the light reflectance of the display surface cannot be controlled with high precision. As a result, it becomes difficult to increase the display quality of the white display, and the high-definition display cannot be achieved. Particularly in the display device of the first conventional example, the small pores that are communicatively connected with one another are used in all over the inside of the porous body, and the liquid is applied on the surface of the porous body, so that it is difficult to improve not only the display quality of the white display but also display quality of other colors that are displayed by the above-described base.

Whereas, in the case where the porous body is colored, light that is colored in the color of the porous body is included in the light reflected by the inner wall surface, which causes degradation of color purity of white, and also degrades the display quality of the white display.

Moreover, a display device of a fourth conventional example adopts an electrowetting system that changes an interfacial tension of the liquid in the small pores by applying an electric field to the liquid, and moves the liquid by utilizing an electrowetting phenomenon (electrocapillary phenomenon) as described in JP 10(1998)-39799 A, for example.

More specifically, this display device of the fourth conventional example comprises transparent sheets, which include a first sheet, a second sheet and a third sheet that are arranged serially from the display surface side at a predetermined interval. An upper-side space is disposed between the first sheet and the second sheet, and a lower-side space is disposed between the second sheet and the third sheet. The upper-side space and the lower-side space are connected communicatively via two reservoirs that are disposed on the second sheet. Moreover, in the upper-side space, the lower-side space and the reservoirs, a colored liquid that is colored in a predetermined color and a transparent liquid are closed. Furthermore, in the display device of the fourth conventional example, a white sheet is disposed so as to cover a surface of the third sheet on the display surface side or a non-display surface side, and it achieves the white display. That is, the display device is structured so that the white display can be achieved on the display surface by using the white sheet, by moving the colored liquid into one of the two reservoirs and moving the transparent liquid into the upper-side space and the lower-side space.

However, in this display device of the fourth conventional example, the white sheet is exposed to the external light and the liquids all the time, and thus the color of the white sheet is likely to be changed to gray or the like over the course of time, which may lead to the degradation of the display quality of the white display. Moreover, the white sheet is required to be disposed on the third sheet that has the longest distance from the display surface. Therefore, it is difficult to increase the color purity of white and to improve the display quality of the white display.

SUMMARY OF THE INVENTION

Therefore, with the foregoing in mind, it is an object of the present invention to provide a display device that can improve the display quality of the white display and can achieve the high-definition display, and an electrical apparatus using the display device.

In order to attain the above-described object, the display device of the present invention is a display device that displays by allowing external light to be incident from outside, and reflecting the incident external light so as to output the incident external light from a display surface, wherein a porous body having a front face that is provided on the display surface side is included, a colorless and transparent material is used for the porous body, an one-end opening is formed on the front face side in the porous body, and plural small pores that are independent of one another are provided inside the porous body.

In the display device with the above-described configuration, the porous body is used with a colorless and transparent material, and the plural small pores that respectively have openings on the display surface side are provided so as to be independent of one another inside the porous body. Thereby, a decrease of the efficiency to utilize the external light and a decrease of the color purity of white are prevented, and a light scattering intensity that is generated on an interface between the inner wall surface of the porous body surrounding the small pore and the air in the small pore can be increased in each of the plural small pores, so that reflected light of the external light that is reflected by the interface can be strengthen. As a result, unlike the conventional example, the display quality of the white display can be improved, and the high-definition display can be achieved.

Moreover, in the display device, each of the plural small pores may be formed so as to pierce the porous body in a thickness direction of the porous body that connects the front face and a rear face facing the front face.

In this case, each of the small pores pierces the porous body in the thickness direction thereof, and thus the high-definition display can be achieved more easily.

Moreover, the display device preferably include: a liquid storage that is provided on the rear face side of the porous body and can store a liquid; and a driving portion that can apply an electric field to the liquid, and changes a display color that is displayed on the display surface by moving the liquid from the liquid storage toward the porous body side and filling an inside of each of the plural small pores with the liquid, when applying the electric field to the liquid.

In this case, the driving portion can change the display color on the display surface according to the information to be displayed on the display surface, so that the display device with an excellent displaying function can be structured easily.

Moreover, in the display device, the plural porous bodies may be respectively provided corresponding to plural colors that can be displayed for color images on the display surface, and the driving portion may move the liquid from the liquid storage that corresponds to each pixel for displaying each of the plural colors toward the porous body side.

In this case, the driving portion appropriately moves the liquids that correspond to the plural porous bodies for displaying the respective colors, thereby displaying a color image.

Moreover, in the display device, the driving portion preferably includes: an electrode that is provided to each of the small pores inside the porous body; a dielectric layer that is laminated on the electrode; a counter electrode that is disposed inside the liquid storage so as to face each of the plural small pores; and a switch and a power supply that are connected between the electrode and the counter electrode.

In this case, the display device of the electrowetting system that moves the liquid by utilizing the electrowetting phenomenon is structured, which can move the liquid at a high speed, so that the display device having an increased switching speed of the display color on the display surface and an excellent displaying function can be structured easily.

Moreover, in the display device, an insulating film, which exhibits a hydrophilic property with respect to the liquid when a voltage of the power supply is applied to the electrode, may be laminated on the dielectric layer.

In this case, a moving speed of the liquid can be increased more, so that the display device that is more suitable for displaying moving images can be structured easily.

Moreover, in the display device, the plural small pores may be arranged in irregular patterns inside the porous body.

In this case, the small pores are arranged non-uniformly inside the porous body, which can increase the light scattering intensity more easily and can improve the display quality of the white display more easily, compared with the case where the small pores are disposed uniformly.

Moreover, in the display device, a light scattering structure for scattering the external light may be provided on an inner wall surface of the porous body surrounding the small pore.

In this case, in the porous body, the light scattering intensity can be increased easily by the above-described light scattering structure, and the display quality of the white display can be improved more easily.

Moreover, in the display device, the light scattering structure is preferably provided on the inner wall surface of the porous body by roughening the inner wall surface.

In this case, the light scattering structure can be provided to the porous body more easily.

Moreover, in the display device, each of the small pores, which are used in the porous body, may have an opening with a circular shape.

In this case, the plural small pores can be formed easily, which can simplify the processes for manufacturing the porous body.

Moreover, in the display device, the small pores, which are used in the porous body, preferably have openings with plural types of circular shapes whose diameters are different from one another.

In this case, by varying the diameters of the small pores, the light scattering intensity can be increased.

Moreover, in the display device, each of the small pores, which are used in the porous body, may have an opening with an ellipse shape, an oval shape, a polygonal shape or a star shape.

In this case, the light scattering intensity can be increased easily.

Moreover, in the display device, the small pores, which are used in the porous body, preferably have openings with at least two of a circular shape, an ellipse shape, an oval shape, a polygonal shape and a star shape in combination.

In this case, the light scattering intensity can be increased more easily.

Moreover, in the display device, the small pores, which are used in the porous body, may be formed to have at least one of a linear shape and a non-linear shape between the front face and a rear face facing the front face.

In this case, processes for adjusting the moving speed of the liquid can be simplified, and the light scattering intensity can be increased easily.

Furthermore, in the electrical apparatus of the present invention is an electrical apparatus including a display portion for displaying information including a character and an image, wherein a display device that displays by allowing external light to be incident from outside and reflecting the incident external light so as to output the incident external light from a display surface is used for the display portion, the display device includes a porous body having a front face that is provided on the display surface side, a colorless and transparent material is used for the porous body, an one-end opening is formed on the front face side in the porous body, and plural small pores that are independent of one another are provided inside the porous body.

In the electrical apparatus with the above-described configuration, the display device that can improve the display quality of the white display, and can achieve the high-definition display is used for the display portion, therefore, the electrical apparatus that is provided with the display portion having an excellent displaying function can be structured easily.

These and other advantages of the present invention will become apparent to those skilled in the art upon reading and understanding the following detailed description with reference to the accompanying figures.

DETAILED DESCRIPTION OF THE INVENTION

Preferred embodiments of the display device and the electrical apparatus of the present invention will be described with reference to the drawings. In the below description, a case where the present invention is applied to an image display provided with a display portion that can display color images will be exemplified for the explanation.

Embodiment 1

Figure 1A:
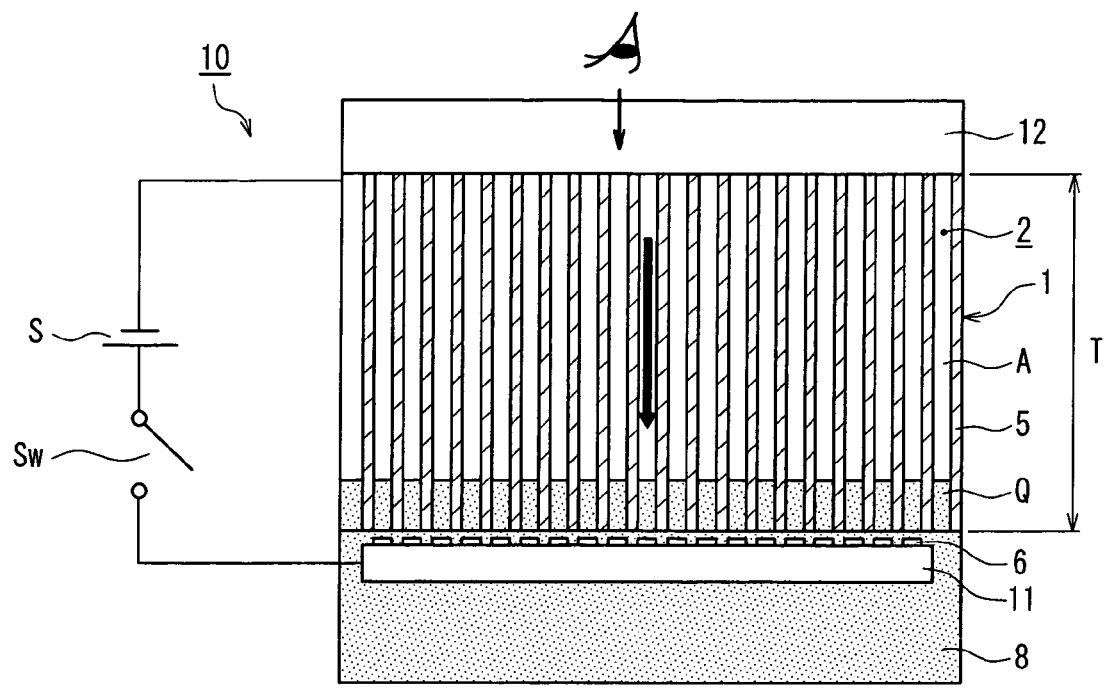
FIGS. 1A and 1B are diagrams schematically showing a configuration of an image display using the display device according to Embodiment 1 of the present invention.
Figure 1B:
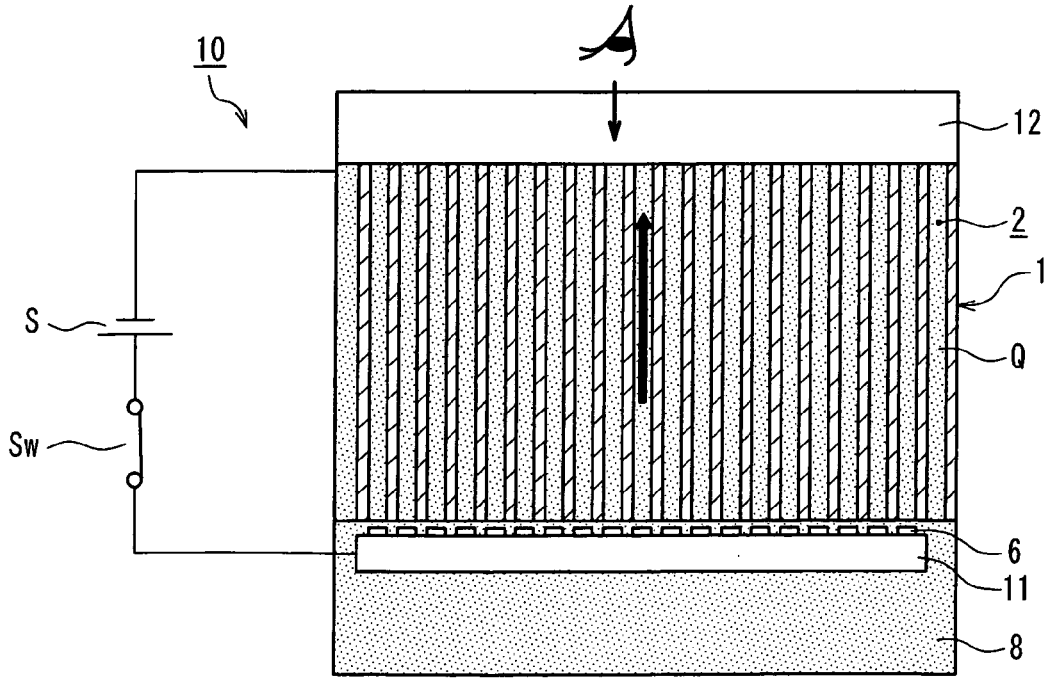
Figure 2:
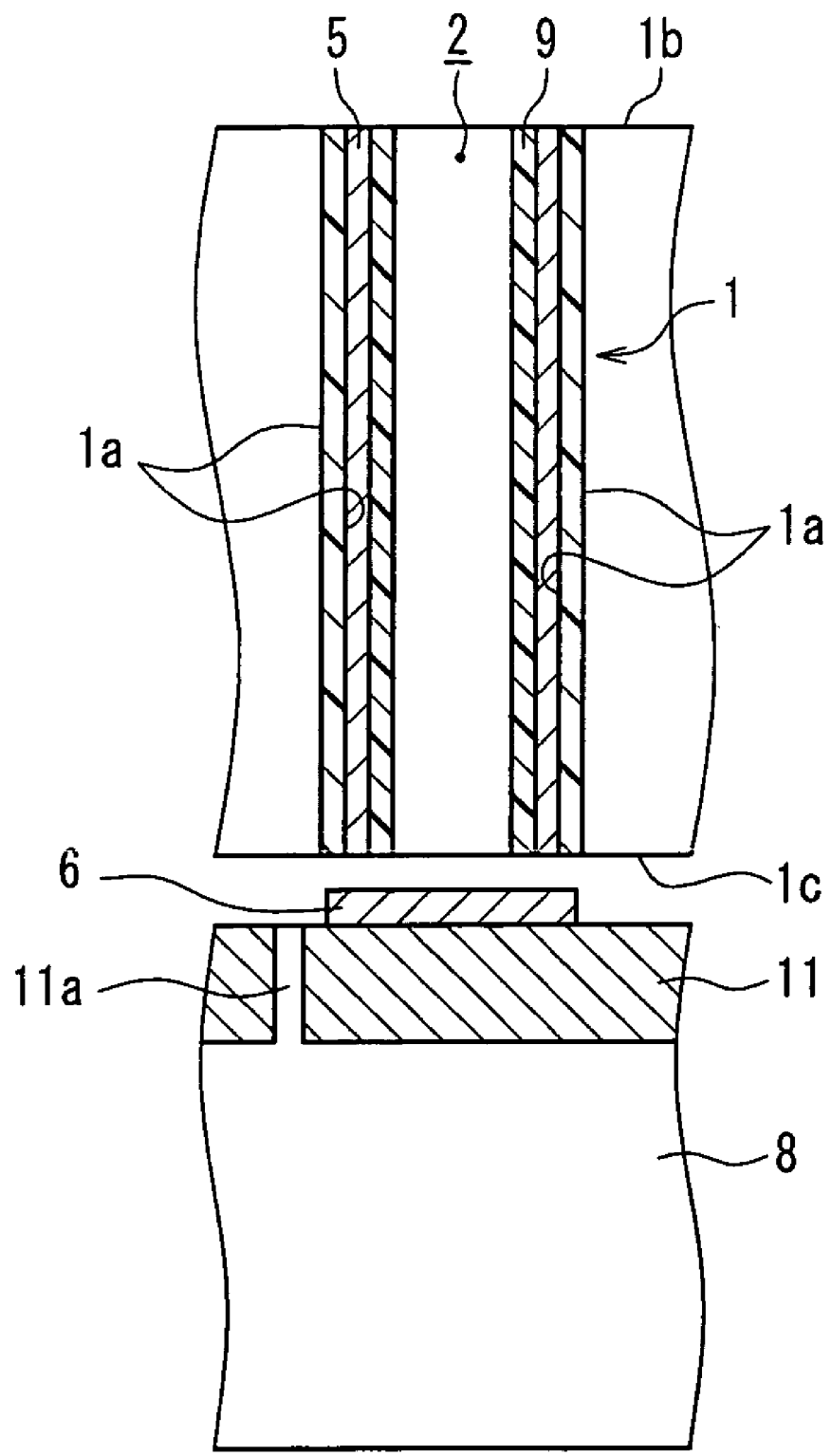
FIG. 2 is an enlarged cross-sectional view showing a configuration of a main part of the display device.
Figure 3:
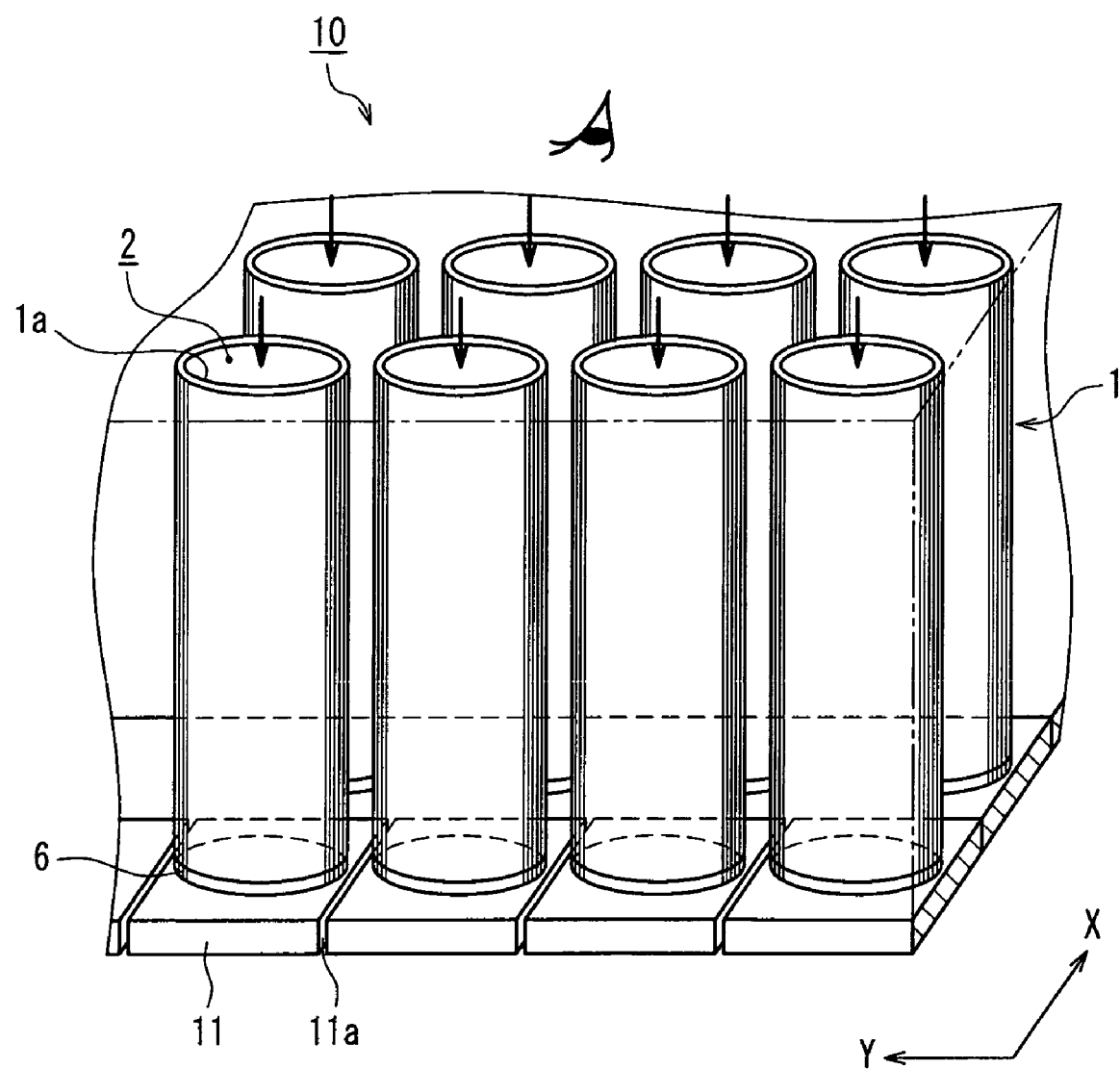
FIG. 3 is a perspective view schematically showing a configuration of a relevant part of the image display.

FIGS. 1A and 1B are diagrams schematically showing a configuration of an image display using the display device according to Embodiment 1 of the present invention. FIG. 2 is an enlarged cross-sectional view showing a configuration of a main part of the display device, and FIG. 3 is a perspective view schematically showing a configuration of a relevant part of the image display. As shown in the figures, the image display of the present embodiment is provided with a display portion that is constituted with the display device 10 of the present invention, where an upper side of this display portion in the figure is a display surface side that is visually observed by a user.

In the display device 10, plural pixels are arranged in matrix (not illustrated in the figures), along both of: a longitudinal direction (represented by an arrow Y in FIG. 3) of the display surface that is parallel with a lateral direction in FIG. 1A; and a transverse direction (represented by an arrow X in FIG. 3) of the display surface is parallel with a direction perpendicular to the sheet of FIG. 1A, and each of these pixels is driven so as to display information including a character and an image on the display portion.

Moreover, the display device 10 is of a reflection type that displays by allowing external light to be incident from outside, and reflecting the incident external light so as to output the incident external light from the display surface, and is structured to scatter and reflect the external light so that a display color on the display surface is white.

More specifically, as shown in FIGS. 1A and 1B, the display device 10 includes: a porous body 1 having plural small pores 2; a transparent substrate 12 that is provided on the porous body 1 on the display surface side; a liquid storage 8 that is provided on the porous body 1 on the non-display surface side; and a substrate 11 that is disposed inside this liquid storage 8. A glass material or a resin such as an acrylic resin is used for the transparent substrate 12, and the transparent substrate 12 is provided so as to cover a whole of the display surface, for example.

Moreover, the porous body 1, the liquid storage 8 and the substrate 11 for each pixel are stored inside a case (not illustrated). That is, an internal space of the case is partitioned into storage spaces for respective pixels by partition walls (not illustrated), and the porous body 1, the liquid storage 8 and the substrate 11 that are provided in each pixel are stored in each of the storage spaces. Moreover, in each of the storage spaces, the porous body 1 is stored so that a front face 1b (FIG. 2) which is provided on the porous body 1 on the display surface side faces a surface of the transparent substrate 12 on the non-display surface side, and a rear face 1c (FIG. 2) which faces the front face 1b is in touch with an upper face of the liquid storage 8.

Moreover, in the liquid storage 8, a liquid Q that exhibits conductivity such as an aqueous solution of potassium chloride is stored. Furthermore, as the liquid Q, a colorless and transparent liquid that contains no coloring matter such as a pigment and a dye is used.

Moreover, the display device 10 includes: an electrode 5 that is provided to each of the small pores 2 inside the porous body 1; a counter electrode 6 that is formed on the substrate 11 so as to face the small pore 2; and a switch Sw and a direct-current power supply S that are connected between the electrode 5 and the counter electrode 6, and is structured so that the display color on the display surface can be changed by moving the liquid Q according to ON/OFF operations of the switch Sw. That is, as described below in detail, the display device 10 adopts an electrowetting system that moves the liquid Q by utilizing an electrowetting phenomenon. As shown in FIG. 1A, when the switch Sw is OFF, the display color on the display surface is made white, by holding the liquid Q in the small pore 2 on the liquid storage 8 side. On the other hand, as shown in FIG. 1B, when the switch is turned ON, the display color is changed to the color other than white, by moving the liquid Q from the liquid storage 8 side toward the display surface side and allowing the liquid Q to penetrate the insides of the small pores 2.

Herein, in FIGS. 1A and 1B, for the simplicity of the figures, a state where a lower-side surface of the transparent substrate 12 and the front face 1b (FIG. 2) of the porous body 1 are in touch with each other is illustrated, but a predetermined gap layer is provided between the transparent substrate 12 and the porous body 1. Thereby, in the display device 10, when the liquid Q inflows into or outflows from the small pore 2, an air A can be moved between the small pore 2 and the gap layer so that the liquid Q can be moved smoothly. Moreover, as shown in FIG. 1A, in the display device 10, a part of the inside of the small pore 2 on the liquid storage 8 side is penetrated with the liquid Q even when the switch Sw is OFF, and the liquid Q can be moved toward the display surface side immediately when the switch Sw is turned from OFF to ON.

For the porous body 1, a colorless and transparent material is used in order to increase the light scattering intensity and improve the display quality of the white display. More specifically, a colorless and transparent resin, a glass material or a ceramic material is used for the porous body 1, which absorbs the least amount of the external light that is incident from the display surface side when the small pore 2 is not filled with the liquid Q, and prevents the undesirable coloring of the external light. Thereby, the light scattering intensity of the porous body 1 can be increased, and the display quality of the white display thereof can also be improved, as described below.

Moreover, as the above-described resins, synthetic resins of either thermoplastic resins or thermosetting resins can be used for the porous body 1. More specifically, epoxy resins, acrylic resins, polyimide resins, polyamide resins, polycarbonate, Teflon (registered trademark) and the like can be used. Furthermore, as the ceramic material, aluminium oxide, titanium oxide, silicon oxide and the like can be used for the porous body 1.

Moreover, as illustrated also in FIGS. 2 and 3, in the porous body 1, each of the plural small pores 2 is composed of a fine through hole that pierces the porous body 1 in its thickness direction that connects the front face 1b and the rear face 1c. That is, in the porous body 1, each of the small pores 2 is formed so as to pierce the porous body 1 in the thickness direction so that an one-end opening and an other-end opening are respectively formed on the front face 1b side and the rear face 1c side.

Moreover, the small pores 2 are provided independently of one another inside the porous body 1, by a photolithography method, an anodic oxidation method, an etching method and a printing method including an imprint and the like. Furthermore, as shown in FIG. 3, each of the plural small pores 2 has an opening with a circular shape, and the plural small pores 2 are arranged in a regular pattern in the transverse direction and the longitudinal direction of the display surface in the porous body 1. That is, each of the small pores 2 is perpendicular to the front face 1b and the rear face 1c, and is formed to have a linear shape connecting the front face 1b and the rear face 1c communicatively, but these small pores 2 are not connected with one another in the porous body 1. That is, the porous body 1 used herein does not have a form like a sponge in which the small pores 2 are connected with one another disorderly, but has a form like a capillary in which the small pores 2 are independent of one another.

Moreover, each of the small pores 2 used here has the opening with a circular shape having a diameter ranging from about 0.1 μm to about 100 μm. By determining the diameter of the small pore 2 as described above, the porous body 1 can achieve the high-definition display easily.

Moreover, in the porous body 1, a dimension represented by "T" in the thickness direction of the porous body 1 in FIGS. 1A and 1B is determined appropriately according to a material (a physical property such as a refractive index) of the porous body 1, a size and a shape of the small pore 2, and the number of the small pores 2 to be disposed. That is, the dimension T of the porous body 1 in its thickness direction is a value that can be increased or decreased according to the light scattering intensity of the porous body 1, and can be decreased when the light scattering intensity is high. More specifically, the diameter of the small pore 2 ranges, for example, from 1 μm to 10 μm, and the dimension T of the porous body 1 in its thickness direction is, for example, 0.1 mm. Thereby, the display device 10 with an extremely small thickness can be structured easily. Moreover, in the display device 10, light amounts of the reflected light of the respective pixels are uniformalized, so that the information to be displayed on the display surface is prevented from generating the nonuniformity of brightness as much as possible, and the brightness can be uniformalized easily.

Moreover, as illustrated in FIG. 2, in the porous body 1, the above-described electrode 5 using a transparent conductive film and a dielectric layer 9 made of a transparent insulating film are laminated serially on the inner wall surface 1a surrounding the small pore 2, so as to cover a whole of the inner wall surface 1a. Furthermore, the above-described counter electrode 6 is formed to have a cross section with a rectangular shape as shown in FIG. 2, and is disposed on a surface of the substrate 11 so as to face a lower-end opening of the small pore 2 on the rear face 1c side. Furthermore, a surface of each counter electrode 6 on the display surface side is colored in red (R), green (G) or blue (B) so that each pixel has the counter electrodes 6 in the same color. Moreover, in the display device 10, for example, pixel regions for the respective colors of RGB, which form one picture element, are arranged adjacently to one another so that color images can be displayed on the display surface side.

Moreover, as shown in FIGS. 2 and 3, a groove 11a is formed in the substrate 11, by which the liquid Q can be moved smoothly between the inside of the small pore 2 and the liquid storage 8 without being interrupted by the substrate 11.

Moreover, refractive indices of the porous body 1 and the liquid Q are respectively selected so that the above-described external light is not scattered or reflected by the porous body 1, but transmits toward the liquid storage 8 side, when the inside of the small pore 2 is filled with the liquid Q. More specifically, when the above-described aqueous solution of potassium chloride (refractive index: 1.3) is selected as the liquid Q, epoxy resins, aluminium oxide or the like with a refractive index that is equivalent to the refractive index of the liquid Q is selected as the porous body 1. As mentioned above, the materials having substantially the same refractive indices are selected for the porous body 1 and the liquid Q, and when the inside of the small pore 2 is filled with the liquid Q, the refractive index of the liquid Q is substantially matched with the refractive index of the porous body 1. Thereby, the external light is not reflected toward the display surface side by an interface between the porous body 1 and the liquid Q that is filled in the small pore 2, but can transmits the liquid Q and the inside of the porous body 1. As a result, a user can recognize a color that corresponds to any of the colors of RGB that is applied on the surface of the counter electrode 6 on the display surface side.

Moreover, the display device 10 includes a driving portion that changes the display color to be displayed on the display surface, by the electrode 5, the counter electrode 6, the dielectric layer 9, the switch Sw and the direct-current power supply S. That is, this driving portion is structured so that it can apply an electric field to the liquid Q, and fills the inside of each of the small pores 2 with the liquid Q by moving the liquid Q from the liquid storage 8 toward the porous body 1 side, when applying the electric field to the liquid Q. Thereby, the driving portion changes the display color to be displayed on the display surface from white to either of the colors of RGB. Furthermore, in the display device 10, the driving portion changes the display color of each pixel based on the information to be displayed on the display surface so as to improve the displaying function.

The operations of the display device 10 of the present embodiment having the above-described configuration will be specifically described below in detail.

As shown in FIG. 1A, when the switch Sw is OFF, the inside of each of the small pores 2 of the porous body 1 is not filled with the liquid Q, and the air A is present inside each of the small pores 2 on the display surface side. Thus, the external light causes a light scattering phenomenon on an interface between the air A and the inner wall surface 1a, due to a difference between the refractive index of the porous body 1 and a refractive index of the air A, and is reflected by the interface toward the display surface side. As a result, the white display can be achieved on the display surface due to the reflection of the external light.

Herein, since the transparent material is used for the porous body 1, even when a part of the external light is not reflected by the inner wall surface 1a but transmits the inside of the porous body 1, almost all of the transmitted part of the external light can travel toward the adjacent small pore 2 side without being absorbed by the porous body 1, and can be scattered and reflected by the inner wall surface 1a surrounding this small pore 2. Therefore, in the porous body 1, a decrease of the efficiency to utilize the external light can be prevented, and a light reflectance of the display surface can be controlled with high precision. Moreover, since the colorless material is used for the porous body 1, a decrease of the color purity of white caused by the reflected light can be prevented. Thereby, in the porous body 1, unlike the above-described first to third conventional examples, the light scattering intensity with respect to the external light can be increased. Furthermore, since the porous body 1 achieves the white display by utilizing the light scattering phenomenon, unlike the fourth conventional example using the white sheet, the deterioration of the display quality of the white display due to the change over the course of time can be prevented as much as possible.

Moreover, as shown in FIG. 1B, when the switch Sw is ON, the electric field is applied to the liquid Q inside the small pore 2, and an interfacial tension of the liquid Q is changed. That is, wettability of the liquid Q with respect to the inner wall surface 1a is changed, a contact angle of the liquid Q with respect to the inner wall surface 1a is decreased, and the liquid Q is moved toward the front face 1b side (the display surface side) inside the small pore 2, whereby the small pore 2 is filled with the liquid Q up to its display surface side. Thereby, due to the matching between the refractive index of the liquid Q and the refractive index of the porous body 1, a user can visually observe the surface of the counter electrode 6 on the display surface side, and the display surface displays the color that is applied on the surface of the counter electrode 6. Thereafter, when the switch Sw is turned OFF so as to stop the application of the electric field to the liquid Q, the wettablity of the liquid Q with respect to the inner wall surface 1a is changed, the contact angle is increased significantly, and the liquid Q is moved toward the liquid storage 8 side inside the small pore 2, whereby the display surface is changed to achieve the white display by utilizing the light scattering phenomenon.

In the display device 10 of the present embodiment with the above-described configuration, the porous body 1 is made of the colorless and transparent material. Moreover, in this porous body 1, the plural small pores 2, each of which has the one-end opening formed on the display surface side, are provided to be independent of one another. Thereby, the decrease of the efficiency to utilize the external light and the decrease of the color purity of white can be prevented. Moreover, in each of the plural small pores 2, the light scattering intensity that occurs on the interface between the inner wall surface 1a of the porous body 1 surrounding the small pore 2 and the air A in the small pore 2 can be strengthen. Accordingly, in the display device 10 of the present embodiment, the reflected light of the external light that is reflected by the interface can be increased. As a result, unlike the conventional examples, the display quality of the white display can be improved, and the high-definition display can be achieved. Furthermore, since the display device 10 that can improve the display quality of the white display and can achieve the high-definition display is used for the display portion as mentioned above, an image display (an electrical apparatus) that is provided with the display portion having an excellent displaying function can be structured easily.

Moreover, in the display device 10 of the present embodiment, since each of the small pores 2 is formed to have a linear shape so as to pierce the porous body 1 in its thickness direction, the display device 10 can increase the switching speed of the display color by moving the liquid Q at a higher speed, and can achieve the high-definition display more easily.

Embodiment 2

Figure 4A:
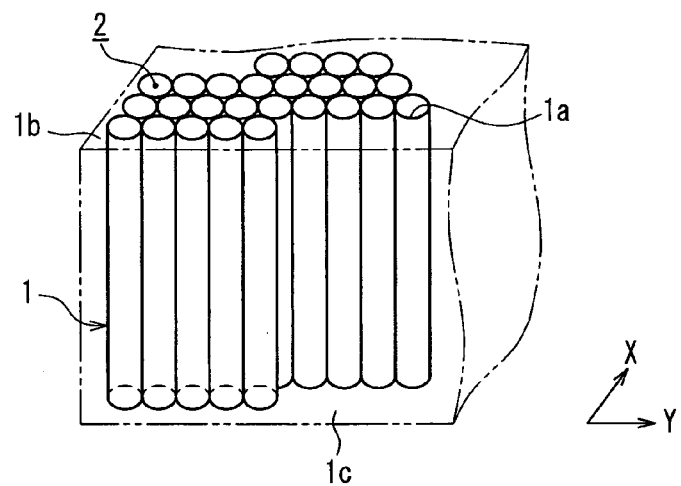
FIG. 4A is a perspective view showing a relevant part of a porous body of the display device according to Embodiment 2 of the present invention.
Figure 4B:
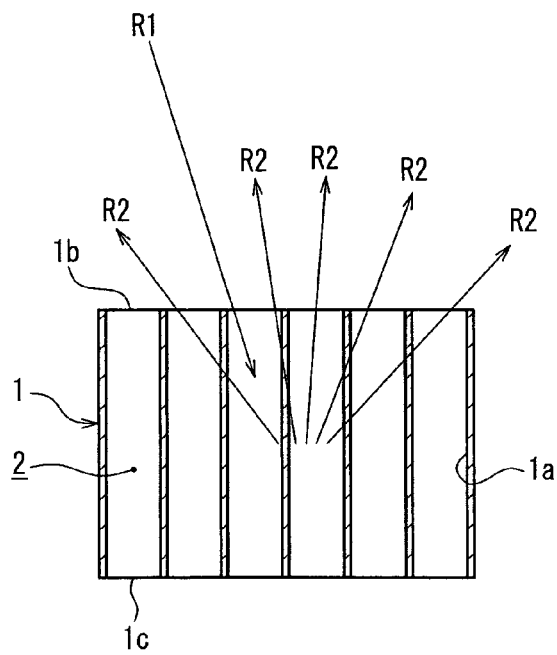
FIG. 4B is a cross-sectional view showing the relevant part of the porous body when an inside of each of plural small pores provided in the porous body is not filled with a liquid.
Figure 4C:
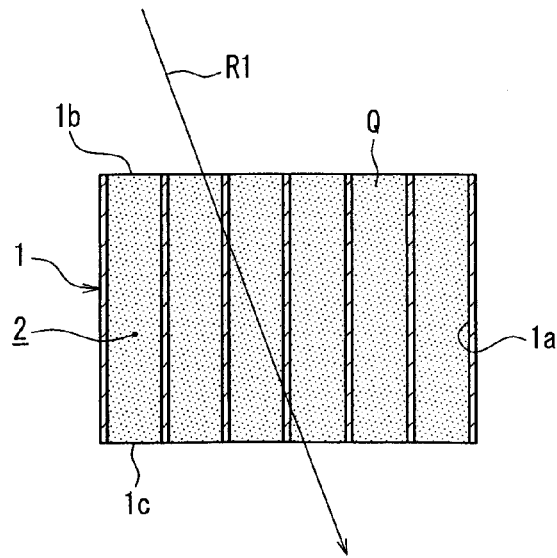
FIG. 4C is a cross-sectional view showing the relevant part of the porous body when the inside of each of the plural small pores is filled with the liquid.

FIG. 4A is a perspective view showing a relevant part of a porous body of the display device according to Embodiment 2 of the present invention. FIG. 4B is a cross-sectional view showing the relevant part of the porous body when an inside of each of plural small pores provided in the porous body is not filled with a liquid. FIG. 4C is a cross-sectional view showing the relevant part of the porous body when the inside of each of the plural small pores is filled with the liquid. As shown in the figures, a main distinctive point of the present embodiment from above-described Embodiment 1 is that the plural small pores are arranged in irregular patterns in the porous body. Herein, the same reference numerals are assigned to the same elements as those in Embodiment 1, and their explanations are omitted.

That is, as shown in FIG. 4A, in the present embodiment, the plural small pores 2 are arranged not in a regular pattern but in irregular patterns in the porous body 1. More specifically, in the porous body 1, the five small pores 2 are arranged in a first column (the lowest column in FIG. 4A) in the above-described longitudinal direction, and the nine small pores 2 are arranged in a second column in the longitudinal direction. Moreover, in the porous body 1, for example, the small pores 2 in a fourth column in the longitudinal direction are arranged in positions alternating with positions of the small pores 2 in a third column.

As mentioned above, in the display device 10 of the present embodiment, the small pores 2 are arranged non-uniformly inside the porous body 1. Thereby, in the display device 10 of the present embodiment, the light scattering intensity of the porous body 1 can be increased more easily, and the display quality of the white display can be increased more easily, compared with that of Embodiment 1.

More specifically, since the small pores 2 are arranged non-uniformly in the porous body 1, external light R1 reaches the interface between the inner wall surface 1a and the air A in the small pore 2, and scattering directions of reflected light R2 that is generated on the interface can be more irregular and random than those of Embodiment 1, as shown in FIG. 4B. As a result, a light amount of the reflected light R2 can be increased more easily, the light scattering intensity can be increased more easily, and the display quality of the white display can be improved more easily.

Moreover, as shown in FIG. 4C, when the inside of the small pore 2 is filled with the liquid Q, the external light R1 transmits the porous body 1 and the liquid Q, and the display surface displays either of the colors of RGB, similarly to above-described Embodiment 1.

Moreover, similarly to the porous body 1 of Embodiment 1, the porous body 1 of the present embodiment is also structured so that the light amount of the reflected light R2 of each pixel may be within a predetermined range, and the brightness of the display surface is uniformalized. Furthermore, in the present embodiment, since the light scattering intensity is higher than that of Embodiment 1, lightness of each pixel can be increased more easily. That is, in the present embodiment, an exclusive area of one pixel on the display surface can be decreased, and thus the high-definition display can be achieved easily (the same in the below embodiments).

Embodiment 3

Figure 5A:
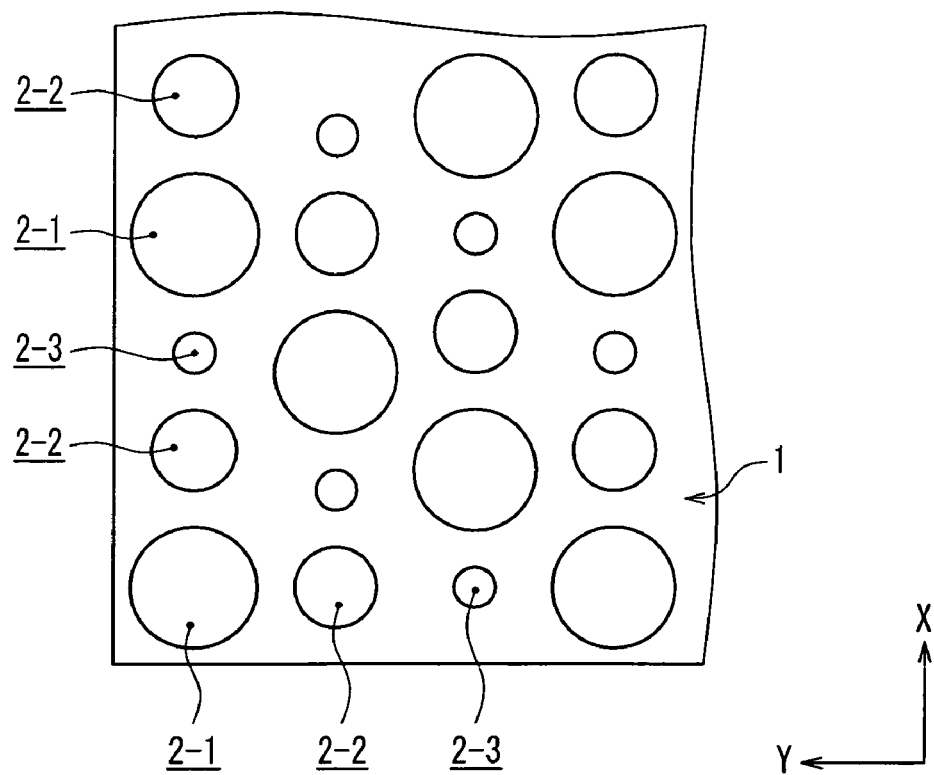
FIGS. 5A and 5B respectively are a plan view and a schematic cross-sectional view showing a porous body of the display device according to Embodiment 3 of the present invention.
Figure 5B:
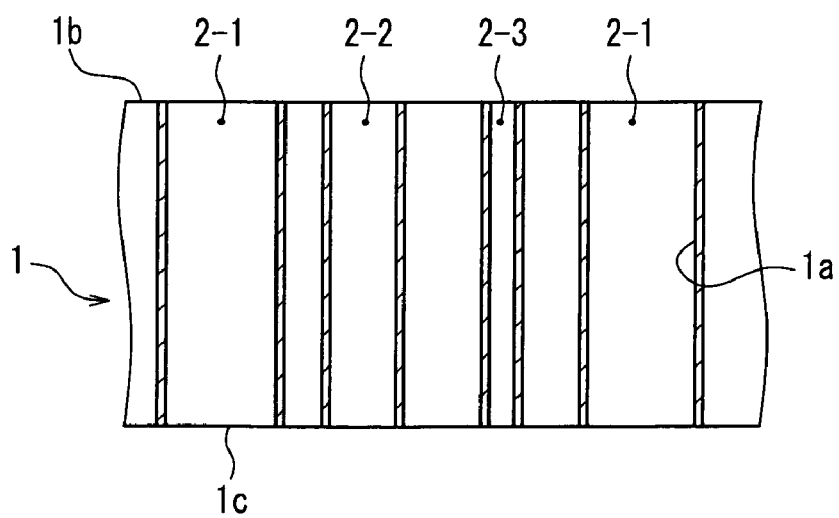

FIGS. 5A and 5B respectively are a plan view and a schematic cross-sectional view showing a porous body of the display device according to Embodiment 3 of the present invention. As shown in the figures, a main distinctive point of the present embodiment from above-described Embodiment 1 is using small pores that have openings with plural types of circular shapes having different diameters. Herein, the same reference numerals are assigned to the same elements as those in Embodiment 1, and their explanations are omitted.

That is, as illustrated in FIGS. 5A and 5B, in the porous body 1 of the present embodiment, three types of small pores 2-1, 2-2 and 2-3 are provided. In each of the small pores 2-1, 2-2 and 2-3, an one-end opening and an other-end opening are respectively provided on the front face 1b side and the rear face 1c side, and the small pores 2-1, 2-2 and 2-3 are formed to have the openings with circular shapes so as to pierce the porous body 1 in its thickness direction. Moreover, diameters of these small pores 2-1, 2-2 and 2-3 are different from one another, and are set to be, for example, 10 µm, 1 µm and 0.1 µm, respectively.

According to the above-described configuration, in the display device 10 of the present embodiment, the scattering light intensity of the porous body 1 can be increased more easily, and the display quality of the white display can be improved more easily, compared with that of Embodiment 1.

Herein, the diameters of the small pores are not limited to the above-described three types, and may be two, four or more types. Moreover, the small pores are not limited to have the configuration where the diameters of the adjacent small pores are different from one another as illustrated in FIGS. 5A and 5B, but may have a configuration where, for example, the small pores in the transverse direction have the same diameters, and the small pores only in the longitudinal direction have different diameters.

Examples of the results of the proof test that was carried out by the inventors of the present application will be described below specifically.

In this proof test, Examples 1 to 3 that respectively correspond to above-described Embodiments 1 to 3 were carried out, in which the display quality of the white display was tested.

More specifically, in Examples 1 and 2, a photosensitive epoxy resin with a thickness of 50 µm was used for the porous body 1. Moreover, the linear-shaped small pore 2 that had an opening with a circular shape having a diameter of 1 µm was provided by the photolithography method using i-rays as exposure light beams. Furthermore, in Example 1, the small pores 2 were arranged in a regular pattern inside the porous body 1 so that adjacent two of the small pores 2 had an interval of 0.5 µm. Whereas, in Example 2, the small pores 2 were arranged in irregular patterns inside the porous body 1 so that adjacent two of the small pores 2 had the minimum distance of 0.1 µm and the maximum distance of 1 µm.

Moreover, in Examples 1 and 2, the aqueous solution of potassium chloride of 1 mM was used as the transparent liquid Q having the refractive index that was substantially the same as the refractive index of the porous body 1. Furthermore, in each of Examples 1 and 2, the image display shown in FIG. 1A assembled, and the switch Sw was turned ON/OFF so as to change the display color on the display surface.

Moreover, in Example 3, an aluminum with a thickness of 50 µm was subjected to the anodic oxidation method so as to manufacture the porous body 1 that was made of transparent aluminum oxide. Furthermore, before the anodic oxidation method, a surface of the aluminum was subjected to the imprint so as to determine positions of the small pores 2 to be disposed, and a voltage to be applied during the anodic oxidation method was adjusted, whereby the linear-shaped small pores 2 that had openings with either of three types of circular shapes having diameters of 0.5 µm, 1 µm and 5 µm were provided. Moreover, as shown in FIG. 5A, the three types of small pores 2 were arranged serially in the longitudinal direction and the transverse direction.

Moreover, in Example 3, the aqueous solution of potassium chloride of 1 mM was used as the transparent liquid Q having the refractive index that was substantially the same as the refractive index of the porous body 1. Furthermore, in Example 3, similarly to Examples 1 and 2, the image display shown in FIG. 1A assembled, and the switch Sw was turned ON/OFF so as to change the display color on the display surface.

Moreover, in the proof test, the display quality of each of the image displays of Examples 1 to 3 was tested by visual observation when achieving the white display. As a result, the display quality of the white display of all of the image displays of Examples 1 to 3 were proved to be higher than that of the conventional image display. Furthermore, an intensity of white of each of the image displays of Example 2 and 3 was higher than that of the image display of Example 1, which proved the further improvement of the display quality of the white display.

Embodiment 4

Figure 6:
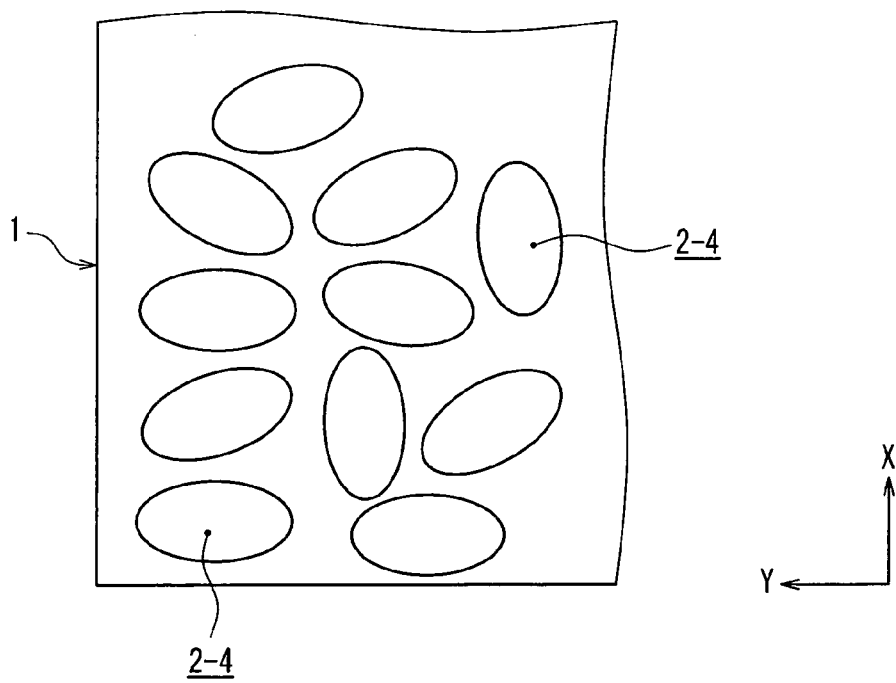
FIG. 6 is a plan view showing a porous body of the display device according to Embodiment 4 of the present invention.

FIG. 6 is a plan view showing a porous body of the display device according to Embodiment 4 of the present invention. In the figure, a main distinctive point of the present embodiment from above-described Embodiment 1 is using small pores that have openings with ellipse shapes. Herein, the same reference numerals are assigned to the same elements as those in Embodiment 1, and their explanations are omitted.

That is, as shown in FIG. 6, plural small pores 2-4 are provided in the porous body 1 of the present embodiment. In each of the small pores 2-4, an one-end opening and an other-end opening are respectively provided on the front face 1b side and the rear face 1c side, and the small pores 2-4 having openings with ellipse shapes are formed so as to pierce the porous body 1 in its thickness direction. Moreover, in each of the small pores 2-4, a circumcircle has the same diameter ranging from about 0.1 µm to about 100 µm. The porous body 1 can achieve the high-definition display easily by setting the circumcircle so as to have the same diameter ranging from about 0.1 µm to about 100 µm (the same in the below embodiments).

Moreover, as illustrated in FIG. 6, major axes of the respective small pores 2-4 do not have the same directions, but have irregular and random directions.

According to the above-described configuration, in the display device 10 of the present embodiment, the light scattering intensity of the porous body 1 can be increased more easily, and the display quality of the white display can be improved more easily, compared with that of Embodiment 1.

Moreover, the plural small pores 2-4 can also have circumcircles with different diameters, respectively. Also, the directions of the major axes of the ellipse shapes may be the same or different.

Embodiment 5

Figure 7:
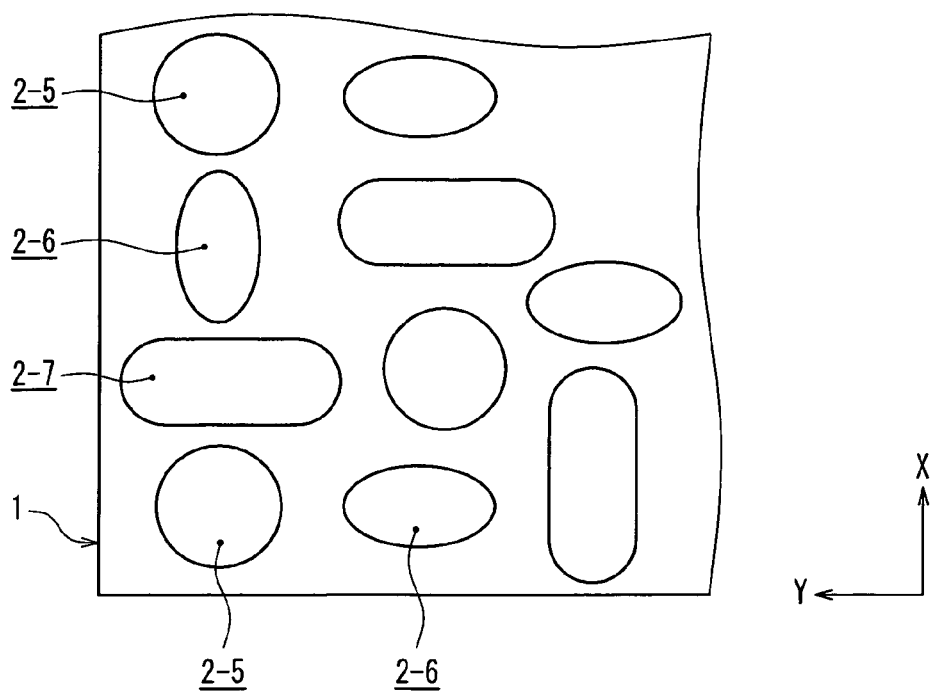
FIG. 7 is a plan view showing a porous body of the display device according to Embodiment 5 of the present invention.

FIG. 7 is a plan view showing a porous body of the display device according to Embodiment 5 of the present invention. In the figure, a main distinctive point of the present embodiment from above-described Embodiment 1 is using small pores, each of which has an opening with either a circular shape, an ellipse shape or an oval shape. Herein, the same reference numerals are assigned to the same elements as those in Embodiment 1, and their explanations are omitted.

That is, as shown in FIG. 7, three types of small pores 2-5, 2-6 and 2-7 that respectively have openings with different shapes are provided in the porous body 1 of the present embodiment. In each of these small pores 2-5, 2-6 and 2-7, an one-end opening and an other-end opening are respectively provided on the front face 1b side and the rear face 1c side, and the small pores 2-5, 2-6 and 2-7 are formed so as to pierce the porous body 1 in its thickness direction. Moreover, the small pores 2-5 are respectively formed to have the openings with perfectly circular shapes, which have the same diameters ranging from about 0.1 µm to about 100 µm. Furthermore, the small pores 2-6 and 2-7 are formed to have the openings with an ellipse shape and an oval shape respectively, and have circumcircles with the same diameters ranging from about 0.1 µm to about 100 µm.

Moreover, in the porous body 1 of the present embodiment, the small pores 2-5, 2-6 and 2-7 are disposed so that adjacent two of these small pores do not have the openings with the same shapes in the longitudinal direction and the traverse direction.

According to the above-described configuration, in the display device 10 of the present embodiment, the light scattering intensity of the porous body 1 can be increased more easily, and the display quality of the white display can be improved more easily, compared with that of Embodiment 1.

Herein, the diameters of the small pores 2-5, 2-6 and 2-7 may be different. Moreover, two types from the above-described three types of the small pores may be used.

Embodiment 6

Figure 8:
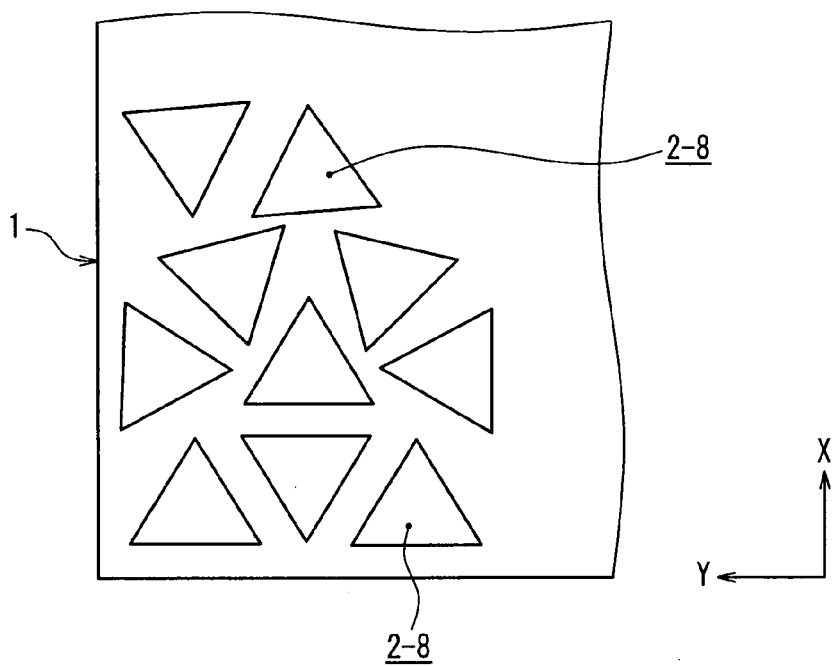
FIG. 8 is a plan view showing a porous body of the display device according to Embodiment 6 of the present invention.

FIG. 8 is a plan view showing a porous body of the display device according to Embodiment 6 of the present invention. In the figure, a main distinctive point of the present embodiment from above-described Embodiment 1 is using small pores having openings with triangle shapes. Herein, the same reference numerals are assigned to the same elements as those in Embodiment 1, and their explanations are omitted.

That is, as shown in FIG. 8, plural small pores 2-8 are provided in the porous body 1 of the present embodiment. In each of the small pores 2-8, an one-end opening and an other-end opening are respectively provided on the front face 1b side and the rear face 1c side, and the small pores 2-8 having the openings with triangle shapes are formed so as to pierce the porous body 1 in its thickness direction. Moreover, in each of the small pores 2-8, a circumcircle is set to the same diameter ranging from about 0.1 µm to about 100 µm, and the respective openings thereof have the same areas and the same shapes. Furthermore, the plural small pores 2-8 are arranged at irregular intervals so that the triangle shapes of the openings have irregular directions, as illustrated in FIG. 8.

According to the above-described configuration, in the display device 10 of the present embodiment, the light scattering intensity of the porous body 1 can be increased more easily, and the display quality of the white display can be improved more easily, compared with that of Embodiment 1.

Herein, other than the above-described types of the small pores, small pores having plural types of openings with triangle shapes that are analogical to one another and have different opening areas may also be provided. Moreover, small pores having openings with other polygonal shapes such as quadrangle shapes, pentangular shapes and hexagonal shapes may also be provided.

Embodiment 7

Figure 9:
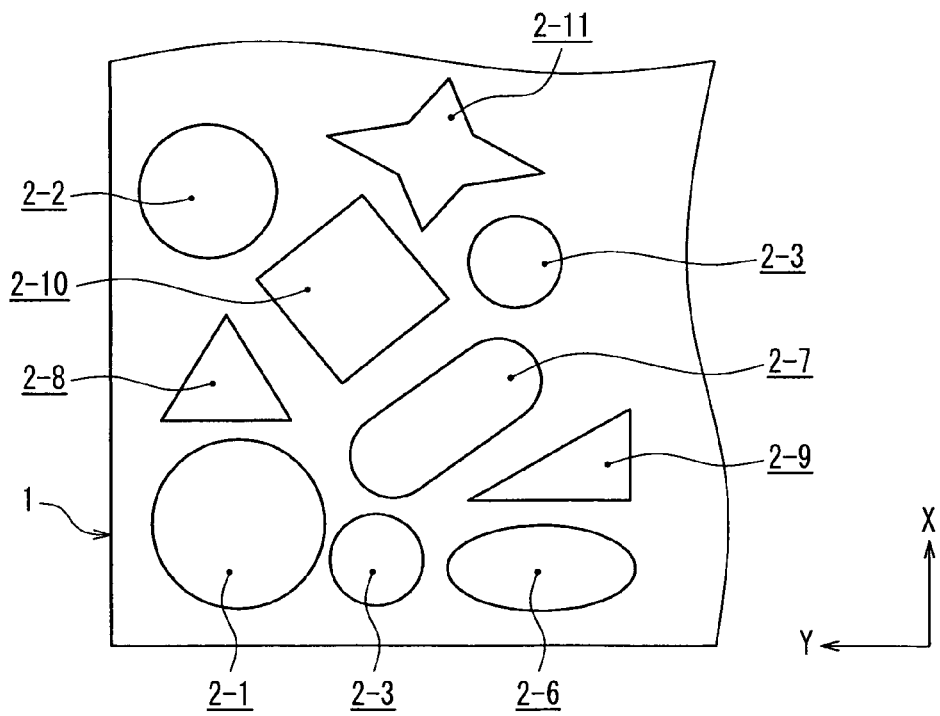
FIG. 9 is a plan view showing a porous body of the display device according to Embodiment 7 of the present invention.

FIG. 9 is a plan view showing a porous body of the display device according to Embodiment 7 of the present invention. In the figure, a main distinctive point of the present embodiment from above-described Embodiment 1 is using small pores, each of which has an opening with either a (perfectly) circular shape, an ellipse shape, an oval shape, a polygonal shape or a star shape. Herein, the same reference numerals are assigned to the same elements as those in Embodiment 1, and their explanations are omitted.

That is, as shown in FIG. 9, plural types of small pores 2-1 to 2-3 and 2-6 to 2-11 that have openings with different shapes are provided in the porous body 1 of the present embodiment. In each of the small pores 2-1 to 2-3 and 2-6 to 2-11, an one-end opening and an other-end opening are respectively provided on the front face 1b side and the rear face 1c side, and the small pores 2-1 to 2-3 and 2-6 to 2-11 are formed so as to pierce the porous body 1 in its thickness direction. Moreover, small pores 2-9, 2-10 and 2-11 are formed to have openings with a right triangle shape, a quadrangle shape and a star shape, respectively, and have circumcircles with the same diameters ranging from about 0.1 µm to about 100 µm.

Moreover, in the porous body 1 of the present embodiment, the small pores 2-1 to 2-3 and 2-6 to 2-11 are arranged so that adjacent two of these small pores do not have the openings with the same shapes in the longitudinal direction and the traverse direction.

According to the above-described configuration, in the display device 10 of the present embodiment, the light scattering intensity of the porous body 1 can be increased more easily, and the display quality of the white display can be improved more easily, compared with that of Embodiment 1.

Herein, other than the above-described types of the small pores, small pores having at least two types of openings with a (perfectly) circular shape, an ellipse shape, an oval shape, a polygonal shape and a star shape may be used in combination in the porous body 1 of the present embodiment.

Embodiment 8

Figure 10A:
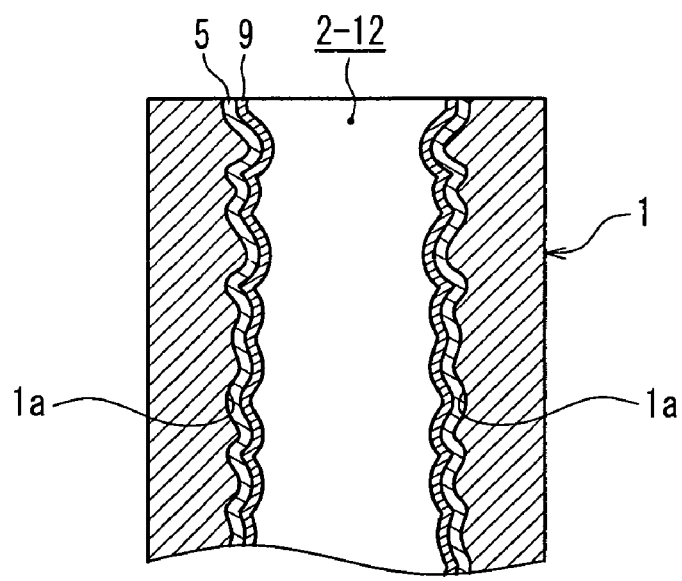
FIG. 10A is an enlarged cross-sectional view showing a configuration of a relevant part of a porous body of the display device according to Embodiment 8 of the present invention.
Figure 10B:
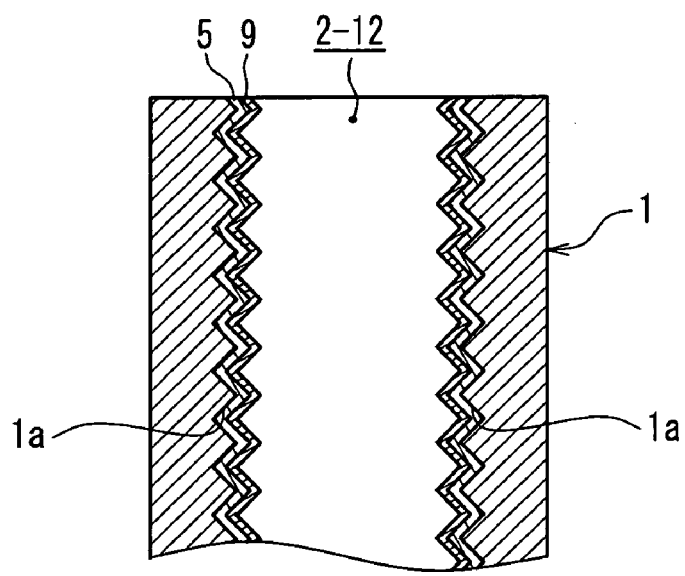
FIG. 10B is an enlarged cross-sectional view showing a configuration of a relevant part of a porous body according to a modified example of the present embodiment.

FIG. 10A is an enlarged cross-sectional view showing a configuration of a relevant part of a porous body of the display device according to Embodiment 8 of the present invention, and FIG. 10B is an enlarged cross-sectional view showing a configuration of a relevant part of a porous body according to a modified example of the present embodiment. In the figures, a main distinctive point of the present embodiment from above-described Embodiment 1 is that a light scattering structure for scattering external light is provided on the inner wall surface of the porous body surrounding the small pore. Herein, the same reference numerals are assigned to the same elements as those in Embodiment 1, and their explanations are omitted.

That is, as shown in FIG. 10A, in the porous body 1 of the present embodiment, the inner wall surface 1a is not smoothened but is roughened. By roughening the inner wall surface 1a as mentioned above, the light scattering structure for scattering external light is provided on the inner wall surface 1a. Moreover, since the electrode 5 and the dielectric layer 9 are laminated serially on the inner wall surface 1a, and thus have shapes that are similar to the shape of the inner wall surface 1a. Furthermore, the inner wall surface 1a is roughened at the same time when small pores 2-12 are formed, and the light scattering structure can be provided to the porous body 1 more easily. Herein, the light scattering structure on the inner wall surface 1a is formed by roughening the inner wall surface 1a so as to provide asperities with sizes that are larger than an approximate wavelength range of the visible light (400 nm to 800 nm).

According to the above-described configuration, in the display device 10 of the present embodiment, the light scattering intensity of the porous body 1 can be increased more easily, and the display quality of the white display can be improved more easily, compared with that of Embodiment 1. More specifically, by roughening the inner wall surface 1a, a surface area of the inner wall surface 1a inside the small pore 2-12 is increased significantly. That is, a surface area of the interface between the inner wall surface 1a and the air A is increased, and the porous body 1 is made of the transparent material, so that the light amount of the reflected light can be increased significantly, and the light scattering intensity can be increased easily. Moreover, since the light scattering intensity is increased as mentioned above, even in the case where the plural small pores 2 are arranged in a regular pattern inside the porous body 1, the light amount of the reflected light can be increased with reliability, thereby improving the display quality of the white display.

Moreover, in the modified example of the present embodiment, other than the above-described light scattering structure, for example, a light scattering structure composed of asperities whose cross sections have fine V-shapes may be provided on the inner wall surface 1a, as shown in FIG. 10B.

Also, a light scattering structure whose cross section has a regular or irregular pattern such as a waveform and a sawtooth waveform may be provided.

Embodiment 9

Figure 11A:
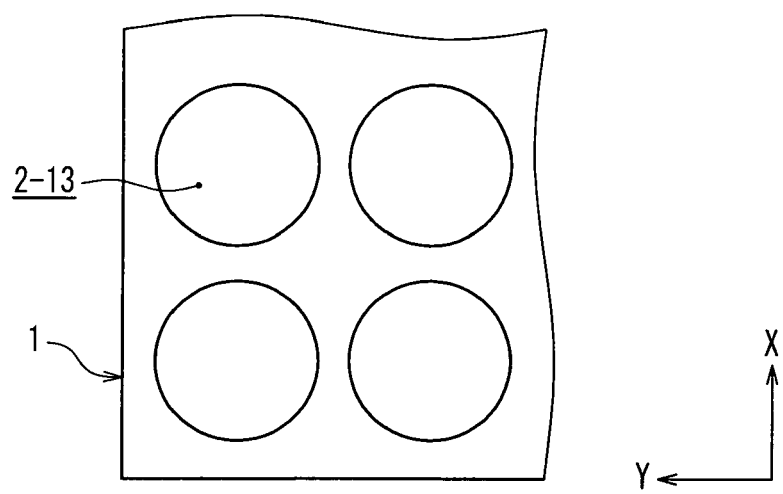
FIGS. 11A and 11B respectively are a plan view and an enlarged cross-sectional view showing a porous body of the display device according to Embodiment 9 of the present invention.
Figure 11B:
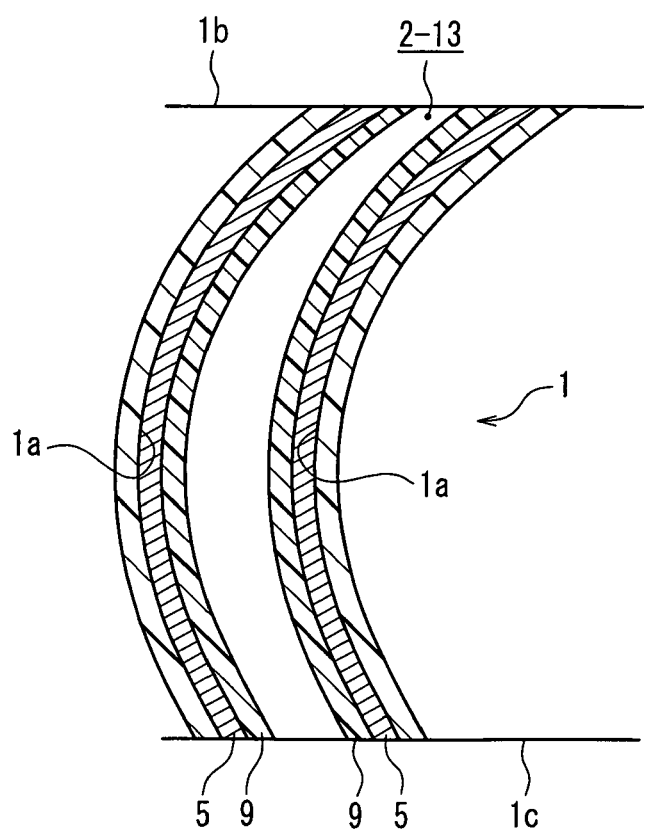

FIGS. 11A and 11B respectively are a plan view and an enlarged cross-sectional view showing a porous body of the display device according to Embodiment 9 of the present invention. As shown in the figures, a main distinctive point of the present embodiment from above-described Embodiment 1 is using small pores which are formed to have non-linear shapes between the front face and the rear face of the porous body. Herein, the same reference numerals are assigned to the same elements as those in Embodiment 1, and their explanations are omitted.

That is, as shown in FIGS. 11A and 11B, plural small pores 2-13 are provided in the porous body 1 of the present embodiment. In each of the small pores 2-13, an one-end opening and an other-end opening are respectively provided on the front face 1b side and the rear face 1c side, and the small pores 2-13 having openings with circular shapes are formed so as to pierce the porous body 1 in its thickness direction. Moreover, the small pore 2-13 has a non-linear shape that is curved to have a predetermined radius of curvature inside the porous body 1, as shown in FIG. 11B. Furthermore, the radius of the curvature of the small pore 2-13 is determined based on the moving speed of the liquid Q, an interval of the small pores 2-13 to be disposed and the like, thus having an appropriate value that can prevent a significant decrease of the switching speed of the display color is determined.

According to the above-described configuration, in the display device 10 of the present embodiment, the light scattering intensity of the porous body 1 can be increased more easily, and the display quality of the white display can be improved more easily, compared with that of Embodiment 1. That is, by using the small pores 2-13 that are curved in the thickness direction of the porous body 1, the surface area of the interface with the air A can be increased, the reflected light of the external light can travel while being diffused more, and the light amount of the reflected light to be output toward outside can be increased more easily.

Moreover, other than the above-described type of the small pores, for example, small pores, which have meandering shapes between the front face 1b and the rear face 1c of the porous body 1, may be formed. Furthermore, other than such small pores having non-linear shapes, small pores, which are inclined linearly between the front face 1b and the rear face 1c, may also be used. Also, small pores that are formed to have at least one of linear shapes and non-linear shapes may be provided in combination. Moreover, besides the small pores described in FIG. 11A, small pores whose openings are positioned in irregular patterns on the front face 1b or the rear face 1c, may also be provided.

Embodiment 10

Figure 12A:
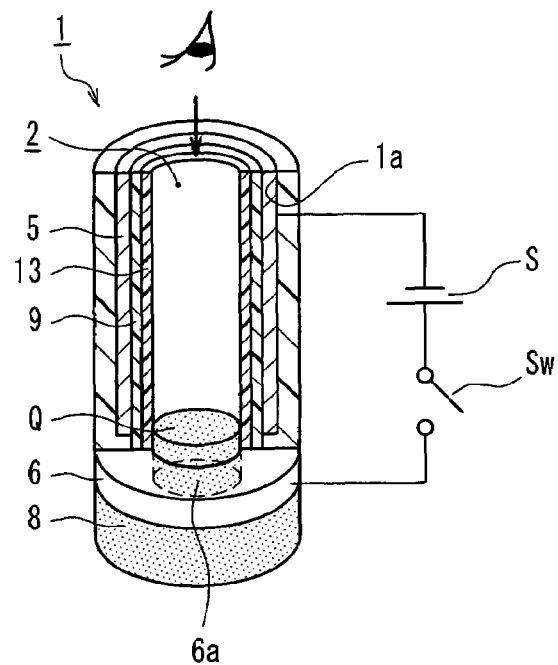
FIGS. 12A and 12B are schematic diagrams for explaining the display device according to Embodiment 10 of the present invention.
Figure 12B:
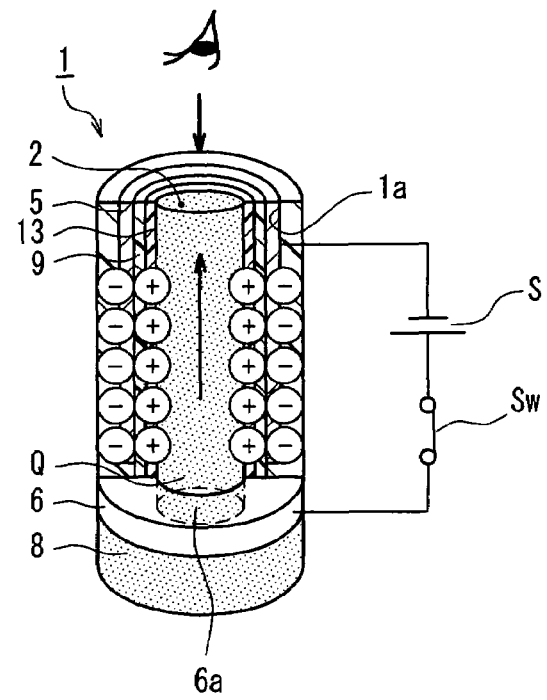

FIGS. 12A and 12B are schematic diagrams for explaining the display device according to Embodiment 10 of the present invention. As shown in the figures, a main distinctive point of the present embodiment from above-described Embodiment 1 is that an insulating film which exhibits a hydrophilic property with respect to the liquid is laminated on the dielectric layer, when a voltage of the power supply is applied to the electrode. Herein, the same reference numerals are assigned to the same elements as those in Embodiment 1, and their explanations are omitted.

That is, as shown in FIGS. 12A and 12B, in the porous body 1 of the present embodiment, a transparent insulating film 13 is formed on the dielectric layer 9 so as to cover a whole inner surface of the dielectric layer 9 in each of the plural small pores 2. For this insulating film 13, a material that exhibits a hydrophobic property with respect to the liquid Q when the switch Sw is OFF, and exhibits a hydrophilic property with respect to the liquid Q when the switch Sw is ON so as to apply a voltage is selected. More specifically, a fluorocarbon resin is used for the insulating film 13. Thereby, in the display device 10 of the present embodiment, the moving speed of the liquid Q can be further increased. That is, according to the ON/OFF operations of the switch Sw, the wettability of the liquid Q with respect to the surface of the insulating film 13 is adjusted to be appropriate for the movement of the liquid Q, whereby the liquid Q can be moved at a higher speed than those of the above-described respective embodiments. As a result, the switching speed of the display color on the display surface can be increased, so that the display device that is more suitable for displaying moving images can be structured easily.

Herein, the above-described embodiments are to be considered in all respects as illustrative and not restrictive. The scope of the present invention is indicated by the claims, and all changes that come within the range of equivalency of the structures described in the claims are intended to be embraced therein.

For example, in the above explanation, the case where the present invention is applied to the image display provided with the display portion that can display color images was described, but the present invention is not limited at all, as long as it is applied to an electrical apparatus that is provided with a display portion for displaying information including a character and an image, and can be preferably applied to an electrical apparatus provided with various display portions, for example, personal digital assistants (PDA) such as electronic personal organizers, displays that are attached to personal computers and TV sets, electric papers and the like.

Moreover, in the above explanation, the configuration where the one-end opening and the other-end opening are respectively provided on the front face side and the rear face side of the porous body, and the plural small pores are formed so as to pierce the porous body in its thickness direction was described, but the porous body of the present invention is not limited to this, as long as it is made of a colorless and transparent material, and includes the plural small pores, which respectively have the one-end openings formed on the front face side and are independent of one another inside the porous body.

More specifically, a small pore having a shape like a test tube, which is opened on its one-end portion side (the display surface side) and is closed on its other-end portion side (the non-display surface side), can also be used. In such a small pore of the test tube type, an opaque and colored liquid is stored on its other-end portion side, so that the small pore can function also as the above-described liquid storage. Moreover, in the small pore of the test tube type, not a full capacity but not more than a half of the capacity of the small pore is filled with the liquid. Furthermore, when the switch is OFF, the liquid is held on the other-end portion side of the small pore, and the white display is achieved by utilizing the light scattering phenomenon with respect to the external light on the one-end portion side. On the other hand, when the switch is ON, the liquid is moved from the other-end portion side toward the one-end portion side, and is held on the display surface side, so that a color that is the same as the colored liquid is displayed.

Moreover, in the above explanation, the case of structuring the display device of the electrowetting system that moves the liquid by changing an interfacial tension of the liquid according to the application of the electric field to the liquid was described, but the display device of the present invention is not limited to this. The present invention can be applied to any display devices including a display device of other electric field induction type such as an electroosmosis system and an electrophoresis system, as long as the display device can change the display color on the display surface side by moving the liquid between the display surface side and the non-display surface side in each of the small pores in the porous body by utilizing an external electric field.

However, as described in the respective embodiments, in the case of structuring the display device of the electrowetting system, the liquid can be moved at a higher speed, and the switching speed of the display color on the display surface can be increased more easily. Thus, it is preferable to structure the display device of the electrowetting system, because the display device that can display moving images easily and has an excellent displaying function can be structured easily.

Moreover, in the above explanation, the case of using the direct-current power supply was described, but an alternating-current power supply, instead of the direct-current power supply, can also be used in the driving portion.

Moreover, in the above explanation, the configuration where the colorless and transparent liquid was used, and the surface of the counter electrode on the display surface side was colored in either of the colors of RGB so as to be provided with the pixel for displaying the color that corresponds to either of RGB was described, but the display device of the present invention is not limited to this at all, as long as it can display color images by being structured to include: the plural porous bodies corresponding to the respective plural colors that can be displayed for color images on the display surface; and the driving portion that can move the liquid from the liquid storage corresponding to each of the pixels for displaying the plural colors toward the porous body side.

More specifically, by providing counter electrodes whose surfaces on the display surface side are respectively colored in cyan (C), magenta (M) and yellow (Y), pixels for displaying the respective colors of CMY may be structured, instead of the above-described pixels for displaying the respective colors of RGB. However, in the case of structuring the pixels for displaying CMY, display quality of black display is more likely to be degraded than that in the case of RGB, and thus it is preferable to provide a pixel for displaying black that includes a counter electrode colored in black. Moreover, counter electrodes that are colored in predetermined combinations of colors selected from the plural colors that can be displayed for color images on the display surface, for example, RGBYC (five colors), RGBC (four colors), RGBY (four colors), GM (two colors) and the like, besides RGB and CMY, can also be used.

Also, opaque color ink that is colored in the respective colors of, for example, RGB may be used as the liquid. In this case, the process for coloring the counter electrode can be omitted.

Also, a configuration where transparent color ink that is colored in the respective colors of, for example, RGB is used as the liquid, and reflectivity is provided on the counter electrode on the display surface side, or the counter electrode is made of a transparent electrode film and reflectivity is provided on the substrate on the display surface side may be adopted. In the case of adopting this configuration, when the inside of the small pore is filled with the color ink, the external light is reflected due to the reflectivity that is provided on the counter electrode or the substrate, so that the corresponding color can be displayed. Moreover, the reflectivity can be provided by coloring the surface of the counter electrode or the substrate on the display surface side in a color that has an excellent light reflectance such as silver, or composing the counter electrode or the substrate using a material such as silver.

Moreover, besides the methods described above, a monochromatic display can be structured by, for example, using a colorless and transparent liquid, and coloring the surfaces of all of the counter electrodes on the display surface side in black Furthermore, besides the methods described above, the display device and the electrical apparatus can also be structured by combining Embodiments 1 to 10 as appropriate.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A display device that displays by allowing external light to be incident from outside, and reflecting the incident external light so as to output the incident external light from a display surface, the display device comprising:
   a porous body having a front face that is provided on the display surface side of the porous body,
   wherein a colorless transparent material is used for the porous body,
   a plurality independent elongated small pores defined in the porous body, each pore being provided with an electrode,
   a substrate supporting a counter electrode associated with at least one pore of the plurality of elongated small pores, wherein a power supply is electrically connected between the counter electrode and the electrodes provided for the pores, and wherein the substrate and counter electrode are located between (i) the pores, and (ii) a reservoir for holding liquid that selectively is moved into and out of the pores based on application of voltage; and
   wherein the entire elongated pores are on a viewer side of the counter electrode, so that the entire small pore associated with the counter electrode is located between the counter electrode and a viewer of the display device.

2. The display device according to claim 1, wherein each of the plural small pores is formed so as to pierce the porous body in a thickness direction of the porous body that connects the front face and a rear face facing the front face.

3. The display device according to claim 2, comprising:
   the reservoir is provided on the rear face side of the porous body and can store the liquid; and
   a driving portion including the power supply that can apply an electric field to the liquid, and changes a display color that is displayed on the display surface by moving the liquid from the reservoir toward the porous body side and filling an inside of each of the plural small pores with the liquid, when applying the electric field to the liquid.

4. The display device according to claim 3, wherein the plural pores are respectively provided corresponding to plural colors that can be displayed for color images on the display surface, and the driving portion moves the liquid from the reservoir that corresponds to each pixel for displaying each of the plural colors toward the porous body side.

5. The display device according to claim 3, wherein the driving portion comprises:
   an electrode that is provided to each of the small pores inside the porous body;
   a dielectric layer that is laminated on the electrode;
   a counter electrode that is disposed so as to face each of the plural small pores; and
   a switch and the power supply that are connected between the electrode and the counter electrode.

6. The display device according to claim 5, wherein an insulating film, which exhibits a hydrophilic property with respect to the liquid when a voltage of the power supply is applied to the electrode, is laminated on the dielectric layer.

7. The display device according to claim 1, wherein the plural small pores are arranged in irregular patterns inside the porous body.

8. The display device according to claim 1, wherein a light scattering structure for scattering the external light is provided on an inner wall surface of the porous body surrounding the small pore.

9. The display device according to claim 8, wherein the light scattering structure is provided on the inner wall surface of the porous body by roughening the inner wall surface.

10. The display device according to claim 1, wherein each of the small pores, which are used in the porous body, has an opening with a circular shape.

11. The display device according to claim 1, wherein the small pores, which are used in the porous body, have openings with plural types of circular shapes whose diameters are different from one another.

12. The display device according to claim 1, wherein each of the small pores, which are used in the porous body, has an opening with an ellipse shape, an oval shape, a polygonal shape or a star shape.

13. The display device according to claim 1, wherein the small pores, which are used in the porous body, have openings with at least two of a circular shape, an ellipse shape, an oval shape, a polygonal shape and a star shape in combination.

14. The display device according to claim 1, wherein the small pores, which are used in the porous body, are formed to have at least one of a linear shape and a non-linear shape between the front face and a rear face facing the front face.

15. An electrical apparatus comprising:
   a display portion for displaying information including a character and an image,
   wherein a display device that displays by allowing external light to be incident from outside and reflecting the incident external light so as to output the incident external light from a display surface is used in the display portion,
   the display device comprises a porous body having a front face that is provided on the display surface side, a plurality of pores being defined in the porous body and each of the pores being provided with an electrode,
   a colorless and transparent material is used for the porous body,
   a one-end opening is formed on the front face side in the porous body,
   a substrate supporting a counter electrode associated with at least one pore of the plurality of pores, wherein a power supply is electrically connected between the counter electrode and the electrodes provided for the pores, and wherein the substrate and counter electrode are located between (i) the pores, and (ii) a reservoir for holding liquid that selectively is moved into and out of the pores based on application of voltage, and
   wherein the entire pore associated with the counter electrode is located between the counter electrode and a viewer of the display device.

* * * * *